March 18, 1952  J. G. MACKECHNIE, JR  2,589,561
LAUNDRY SORTING APPARATUS

Filed Dec. 23, 1949  3 Sheets-Sheet 1

INVENTOR
JAMES G. MACKECHNIE JR.

BY  Chapin & Neal
ATTORNEYS

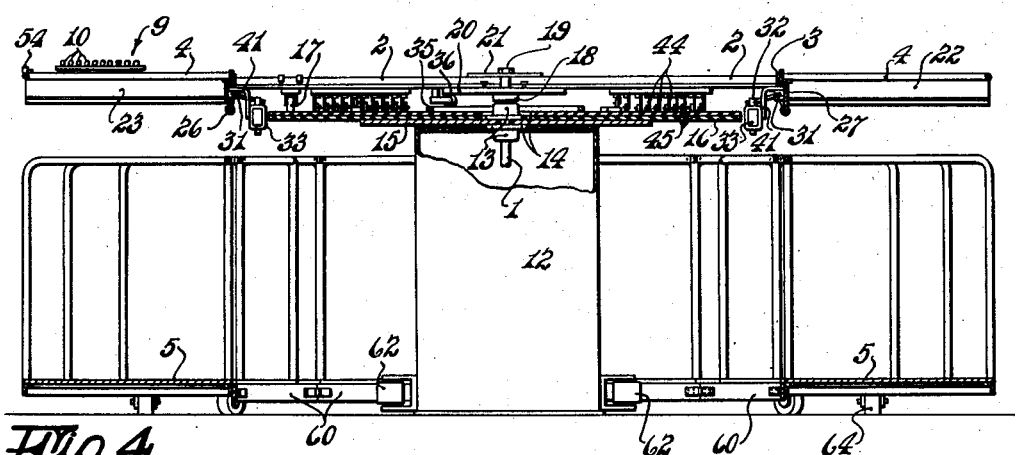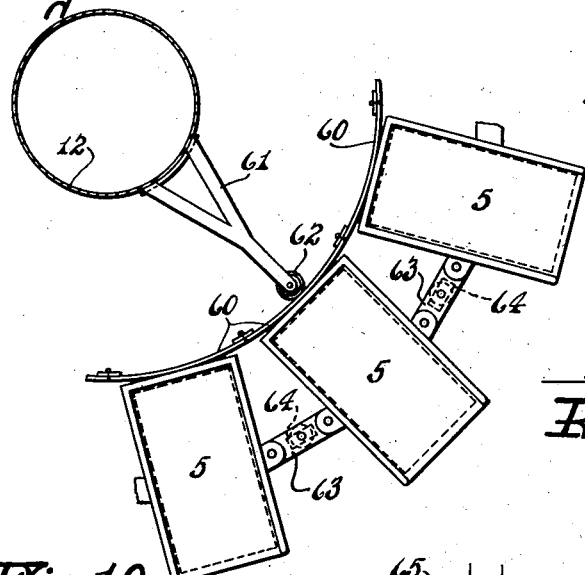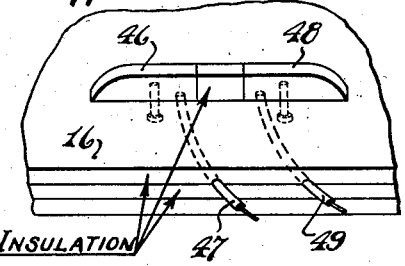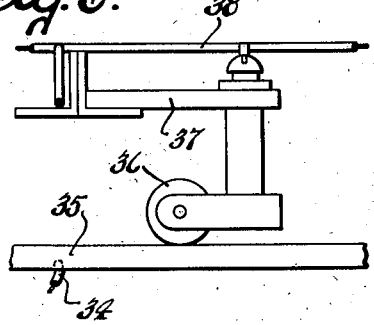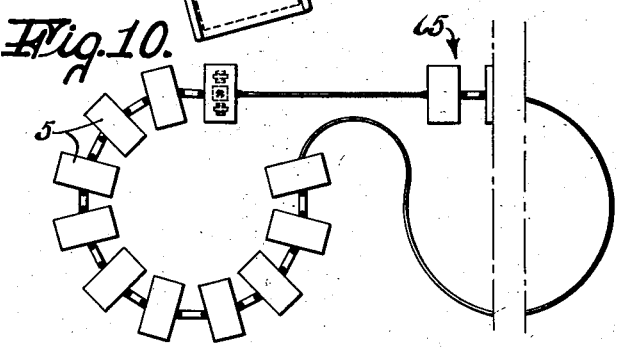

March 18, 1952  J. G. MACKECHNIE, JR  2,589,561.
LAUNDRY SORTING APPARATUS
Filed Dec. 23, 1949  3 Sheets-Sheet 3

INVENTOR
JAMES G. MACKECHNIE JR.
BY Chapin & Neal
ATTORNEYS

Patented Mar. 18, 1952

2,589,561

UNITED STATES PATENT OFFICE 2,589,561

LAUNDRY SORTING APPARATUS

James G. Mackechnie, Jr., Springfield, Mass.

Application December 23, 1949, Serial No. 134,669

5 Claims. (Cl. 214—11)

This invention relates to a selectively controlled sorting apparatus and has for an object to provide a machine to sort articles, and in particular, articles such as items of laundry for return to individual customers.

The invention of the present application is related to a sorting machine of the general type disclosed in my prior application Serial No. 757,768 filed June 28, 1947 for "Laundry Sorting Apparatus," now Patent No. 2,490,071 issued December 6, 1949.

One object of the present invention is to provide a continuously movable, individually presettable, automatic means for conveying articles to various receiving bins for sorting into a bin all items belonging to an individual customer.

Another object is to provide in this type of machine a circularly rotated framework for the series of article trays for improved operation and economy of space.

A further object is to provide a novel arrangement for the control mechanism of the device.

A still further object is to provide for easily replacing receiving bin structure and insofar as possible to maintain uninterrupted sorting operations.

Yet another object is to provide an improved drop mechanism for releasing articles from the conveying means for deposit into a bin. In this aspect of the device, the present disclosure is an improvement in the tray dumping mechanisms disclosed by my copending applications Serial No. 18,512, filed April 2, 1948 and now Patent No. 2,518,036 granted August 8, 1950 and Serial No. 18,513, filed April 2, 1948 and now Patent No. 2,518,037 granted August 8, 1950.

These and other objects and advantages of the new apparatus will be apparent from the following disclosure and accompanying drawings in which, Fig. 1 is a top plan of the new laundry sorting machine;

Fig. 3 is a view partly in section on line 3—3 of Fig. 1;

Fig. 4 is a fragmentary detail to show a bin receiving arrangement;

Figs. 5 and 6 are fragmentary details to show electrical connections on the machine;

Fig. 10 is a diagrammatic view showing an arrangement for rapidly replacing the receiving bin structure.

The operation of the device in general will first be described.

Figure 1:
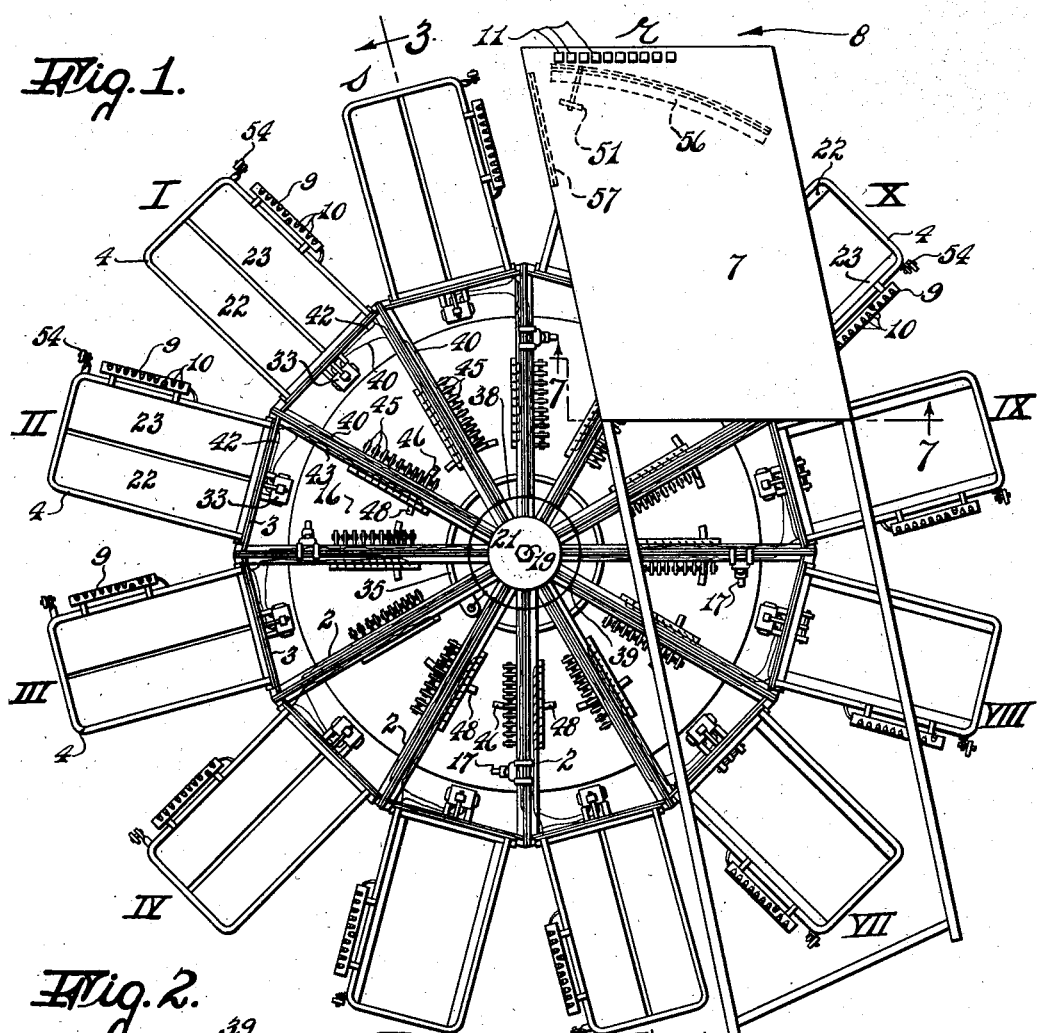

As shown by the plan view of Fig. 1, the framework of the sorter is generally circular in shape. It is adapted to be approximately waist high and in the arrangement as shown by Fig. 1 to rotate in a counterclockwise direction about a central vertical drive shaft 1 actuated by a motor and gear drive mechanism. Horizontal frame spokes 2 extend radially from the drive shaft and are rigidly secured thereto. At the outer ends of the spokes 2 are connecting supports 3 between the ends. On the supports are mounted rectangular horizontal carrier tray frames 4 for the article conveying and dumping means of the device.

Arranged underneath the trays at the outer portion of the circle described by rotation of the frame is a circular series of bins 5 (Fig. 3) adapted to receive articles dumped from the trays.

Overlying a portion of the circle described by the rotating frame structure is a stationary platform 7 on which a group of articles may be placed for sorting. An operator is stationed at the edge of the circle of rotating carrier trays adjacent the end portion 8 of the platform.

The sorter as shown has twelve carrier trays and is adapted for the sorting of ten customers' laundry into separate batches in the bins. Twelve trays are provided so as to permit recovery of the individual tray supporting members after releasing an article into a bin as will be later described.

Assuming a load of laundry belonging to ten customers is on the sorting table for automatic separation and that each customer's items are identified by a number having a different last digit from zero to nine, the apparatus is designed to place each customer's laundry into a separate individual bin. The bin stations below each of which is a bin 5, are assigned numbers from zero to nine and at the side of each carrier tray frame 4 is a keyboard 9 having ten switches as at 10. The switches are also numbered zero to 9 to correspond with the numbers assigned to the bin stations. As the operator removes an item from platform 7 to place it on a passing carrier tray of frame 4 he notes the last digit of the number on the item and actuates the switch 10 having the same digit. By actuating this switch the operator sets up a partial electric circuit which is completed by the arrival of the tray frame at the bin station which is assigned the lead being insulated therefrom. The roller 36 bears continuously on the ring during rotation of the frame and is provided to establish a lead to a circular connector wire 38 supported by spokes 2, rotatable with the frame, and encircling shaft 1.

Figure 8:
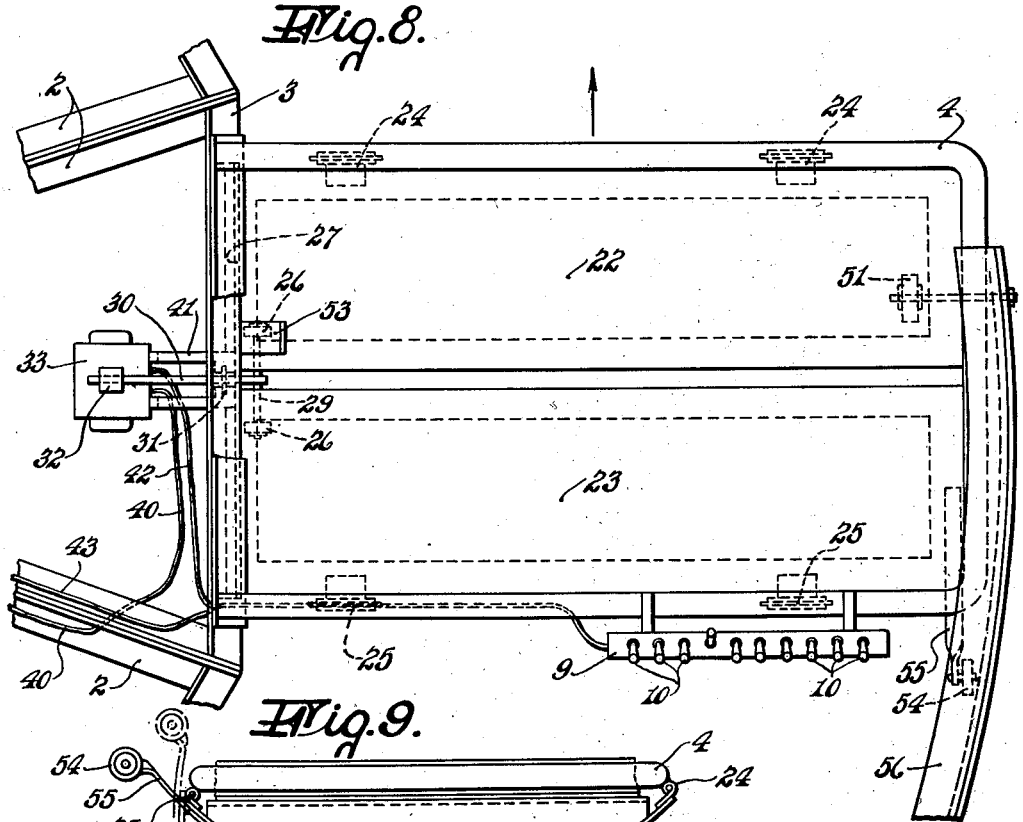
Fig. 8 is a detail plan view of a tray and carrier frame mechanism.

On the circular connector wire 38 are twelve fixed contact points 39 from which solenoid lead wires 40 extend outwardly on the spokes of the frame. As best shown by Fig. 8, each wire 40 is connected to one side of the solenoid of each tray frame. The other side of solenoid 33 is joined by a connector wire 42 to its associated variably presettable switch mechanism 9 mounted on the trailing edge of frame 4.

Each switch mechanism 9 has ten presettable toggle switches 10. The opposite side of each individual switch is connected by a wire 43 to one of a series of ten contact switch fingers 44 mounted on a spoke 2 and positioned intermediate the ends thereof. The fingers are provided with roller contact wheels 45 extending downwardly to ride on the surface of shelf 16 in a circular path (Fig. 1) as the frame is rotated.

The fingers are individually pivoted on spokes 2, each spoke having a separate series of ten fingers arrayed in parallel formation, the number of contacts corresponding to the ten presettable switches on the tray carrier frames.

The fingers are adapted to establish and complete partial bin circuits when the device positions the frames at predetermined bin stations. The partial bin circuits are completed by the finger roller contacts riding on positional contact blocks 46 fixed to shelf 16. As shown in the detail of Fig. 5 each block is connected by a wire 47 which leads back to the source as shown by the wiring diagram of Fig. 2.

The contact blocks 46 are arranged circularly on the shelf and are spaced at varying distances from the central drive shaft 1. It will be noted from the stepped spacing of the blocks as shown by Fig. 1 that in the rotation of the device each block will intercept the same corresponding finger contact roller 45 of each series, inasmuch as each series is mounted in the same relative position on its spoke. For example, the upper block 46 immediately to the left of a vertical center line, as in the drawing of Fig. 1, will be noted as in contact with the innermost contact roller 45. This block will intercept the innermost roller of every series as the spokes are rotated. Correspondingly, the other blocks intercept corresponding rollers in like manner.

Companion contact blocks 48 for operation of a counter mechanism are also fixed to shelf 16 and as shown by Figs. 1 and 5 are each in line with a block 46. The counter contact blocks are spaced and insulated from the bin contact blocks 46, and complete separate partial circuits through wires 49 to solenoids as 50 for tripping a counter mechanism which is connected in the line back to the source of power (see the wiring diagram of Fig. 2). The counter mechanism may be of any suitable electrically actuated construction. The dials 11 are as indicated, arranged on the sorting table 7 at the edge thereof for convenient reference by the operator of the machine (Fig. 1).

Figure 2:
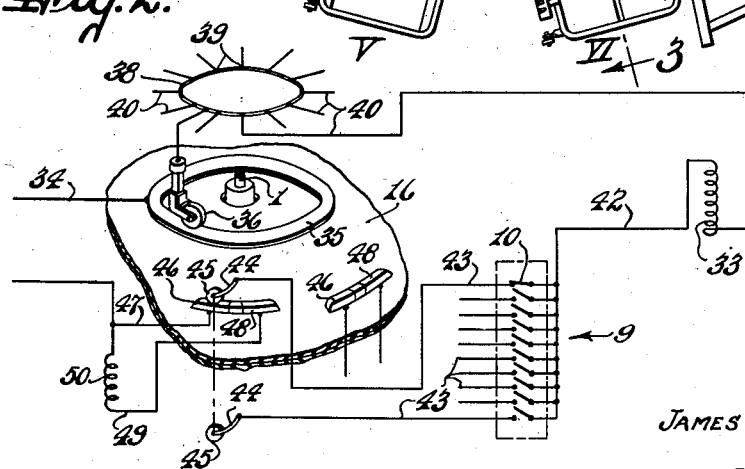
Fig. 2 is a wiring diagram showing the electrical circuits for operation of the device.

Referring again to the wiring diagram of Fig. 2, it will be seen that the energizing of a tray solenoid is conditional upon the closing of one of the tray frame switches 10 and the closing of the corresponding partial bin circuit by contact of roller 45 with block 46. The completion of a circuit to energize the solenoid is thus accomplished by the arrival of the carrier tray frame in its path of rotation at a bin station for which the switch 10 has been actuated.

The bin stations may be assigned numbers from zero to nine and in the drawing of Fig. 1 are shown as arranged in the counterclockwise order indicated by the roman numerals adjacent the outer end of each frame. Underneath the trays in the relative position shown are the receiving bins 5, the specific arrangements of which will be later described.

It will be noted the tray frame in the position immediately adjacent the sorting table and designated by the letter $s$ is at the sorting station where the operator places an item on the tray. As previously described, he actuates a switch numbered to correspond with the number assigned to the laundered item and the number of the bin into which the article is to be dumped. At this location $s$ there is no receiving bin. Nor is there a bin underneath the sorting table for the immediately preceding tray frame at the station designated as $r$ where the tray members are returned to horizontal supporting position. In the embodiment as shown, there are thus twelve tray frames on the device for the sorting of articles to ten different customers, the two additional frames providing for a passage across the recovery and sorting stations $r$ and $s$.

Figure 7:
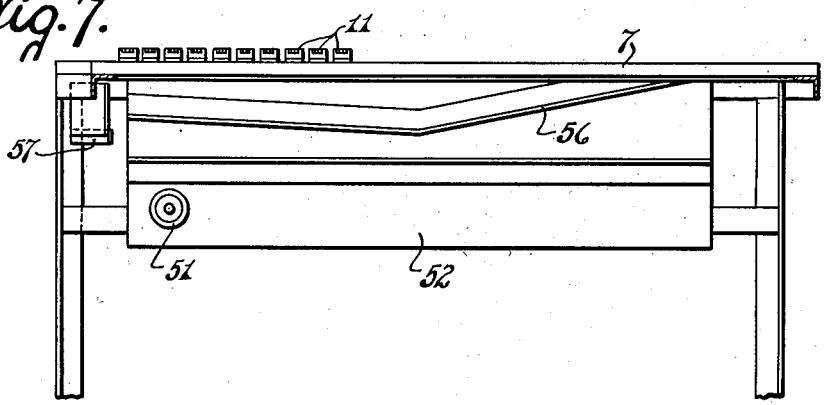
Figs. 7 is a view on line 7—7 of Fig. 1 to show tray positioning structure.

Underneath the table 7 is located the means for recovery of the tray halves, members 22 and 23, to article receiving position. It will be obvious that upon energizing the solenoid of a tray frame the roller supports no longer hold the tray members which are then vertically disposed from the frame sides and swinging freely on their hinges. The recovery of the tray members is accomplished by camming elements fixed on the underside of the table (Figs. 7 and 8).

Figure 9:
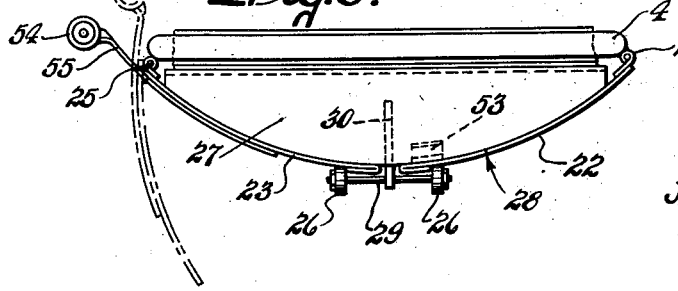
Fig. 9 is an end view of the tray and frame.

For the leading tray member 22 a roller wheel 51 is fixed to a vertical plate 52 at the end of the table, the plate 52 lying adjacent the arcuate outer end of the frames as the latter pass in the path of rotation under the table. The roller wheel 51 projects inwardly of the frame to lie below frame 4 and in the path of the lower portion of the vertically hanging member 22. As member 22 is carried by frame 4 against roller 51, it is pivotally lifted toward horizontal position on its hinges 24. A flange 53 (Figs. 8 and 9) on the inner end edge of member 22 is adapted to push the adjacent roller support 26 of solenoid crank arm 30 out of the path of the rising tray edge to permit return of the supports underneath the same. The flange 53 extends upwardly from the inner edge of the member 22 and is inclined inwardly of the tray frame (Fig. 9).

Simultaneously with the raising of the leading member, the trailing member 23 is raised to horizontal position. For this purpose a roller 54 is carried at the end of an arm 55 fixed at the outer corner of the hinged edge of the member. Arm 55 is angled rearwardly and upwardly above the tray at this corner, and when member 23 is hanging vertically as shown by the dotted position of Fig. 9 the arm is upwardly disposed in vertical position above the frame. When passing under the sorting table the roller 54 contacts the cam surface provided by an inclined flange 56 fixed to plate 52. Flange 56 tilts the tray member gradually toward horizontal position and at the low point of the flange is timed to return its inner edge slightly above its supporting position as the flange 53 of the other tray member kicks the solenoid roller supports 26 rearwardly. Thus the tray halves are returned to position for again receiving and carrying an article placed thereon for sorting. Flange 56 is here upwardly inclined to permit the member 23 to gradually return to the supported position in resting on its roller 26.

It will also be apparent that as a tray frame is rotated to receive another item its switch 10, previously set, remains in "switch on" position. To inactivate the switches and clear the keyboard a reset bar 57 depending from the edge of the sorting platform 7 wipes any of the keys from "on" to "off" position as the frame passes from under the table.

The switches are indicated diagrammatically in the drawings and may be of any suitable toggle construction. In Fig. 8 it will be seen that the fourth key from the left has been pushed forwardly toward the frame. In this position of the key the switch is held by a toggle to set up the contact for the corresponding carrier associated partial circuit. As the frame is carried past the reset bar 57 the key is held against movement to break the switch contact and is pivotally returned to an oppositely angled position with the other keys. Thus, as each individual tray frame is returned in the path of rotation to the location s the tray members are in article receiving condition with the keyboard switches "off."

The bin structure shown by Figs. 3 and 4 is adapted for removal of sorted articles from each bin by rotation of the circular train on the floor underneath the trays to bring each bin in turn to any desired location at the edge of the circle. At such a location the contents of the bins may then be successively removed. If desired, a length of cloth may be cradled in a bin, being draped over the sides thereof. When all the articles have dropped into the bin on the cloth the ends may be lifted with the laundry carried thereby as a unit and the bin quickly emptied.

At the lower inner edges of the bins, straps 60 are fixed, each strap being hinged at its ends to the straps of adjacent bins. The bins are held radially spaced from the central drum 12 by a plurality of spacer arms 61 having rolls 62 bearing against the straps. Links 63 are pivotally joined to the sides of adjacent bins to maintain the desired laterally spaced relation. On the links 63 are supporting wheels 64 for rotating the series of bins on the floor.

In Fig. 10 a different arrangement of bins is diagrammatically shown. In this construction a monorail fixed to the floor underneath the tray frames describes a circular arc except for that portion corresponding to the station s and 7 of Fig. 1, where no bins are necessary. On the monorail is supported a train of ten bins hingedly connected together so that as a sorting operation is completed the train may be pulled away from the receiving stations. A second train 65 of empty bins may immediately replace the first while the latter is taken to a final checking station for removal of its contents. The monorail may describe an endless path of any configuration desired for convenience in emptying the bins away from the sorting mechanism.

It is to be noted that in operation of the device the framework of carrier trays is rotated continuously. In an embodiment of the device it has been found that a sorting device approximately nine feet in overall diameter with the twelve trays as shown may be operated satisfactorily at a speed of 72 feet per minute or 36 drops per minute or less, without wrinkling or disarranging laundered items. At this speed, furthermore, an operator may deposit an article on a passing tray and actuate one of the switches. The speed of the machine may, of course, be varied as may be suitable for sorting operations with different articles.

It will be seen from the above disclosure that at each bin station the same predetermined partial bin circuit is established for every carrier tray which passes by in rotation.

It is to be understood that the construction and use of the machine may be varied for adaptation to various methods for handling and sorting laundry in different plants. For example, in a plant which processes forty customers' laundry in a unit, the items of four different groups of ten customers each may be affixed with tags differently colored or otherwise identified by the tag as belonging to an arbitrary grouping of ten. Each member of a group of ten is assigned a number bearing a different last digit from zero to nine. A ten-unit machine as disclosed (ten bins, ten switches on each tray) may be used for sorting. Those items of the forty-customer unit having the same distinctive color or other arbitrary designation are grouped for sorting on the machine. The operator of the machine merely glances at the last digit of the tag, places the item on a tray, and flips the corresponding switch. The items are automatically sorted into separate bins. The tags identifying a customer's laundry may then be later removed from the articles as at a final wrapping station before delivery.

If it is more convenient in a particular plant, the laundered items may be sorted as to number by the machine and without regard to color. The sorting as to color may be done on removal of the number-sorted items from the bins.

Further, any number of bin and tray units may be provided in a sorting machine, the number of units depending on the particular method desired in handling customers' laundry for sorting. For example, assuming a forty customer bundle unit, a machine with twenty bin stations might be provided with two rows of switches on the trays, each row being numbered from zero to nine and colored differently or otherwise differentiated so that a lot of twenty individual batches may be separated according to their arbitrary designations. It is not intended to limit the device to any particular method of sorting.

What is claimed is:

1. In a selectively controlled sorting apparatus the combination of a horizontally disposed rotatable frame having a vertical axis and means to rotate said frame, a series of trays mounted on said frame, each pivotally supported for movement from an article holding to an article releasing position, a series of bin stations under said frame and receiving bins at said stations below said trays, a sorting table overlying a portion of the circle described by said rotated trays, releasable tray supporting means on the frame for engaging the trays in article holding position, and means to disengage said supporting means including presettable mechanism with positional elements associated therewith and carried by said rotatable frame, stationary positional contact members associated with said bin stations and lying in the path of rotation of said elements, the interengagement of said members and said elements serving to release said tray supporting means on arrival of a tray at a bin station as selectively predetermined by actuating said presettable mechanism, camming elements under said table in the path of trays suspended in article releasing position to return the same to holding position and means under the table to inactivate said presettable mechanism.

2. In a selectively controlled sorting apparatus the combination of a horizontally disposed rotatable frame having a vertical axis and means to rotate said frame, a series of trays mounted on said frame, each movable from an article holding to an article releasing position, a series of bin stations under said frame, a bin at each station, said bins being coupled together as a train, a track supporting the train of bins for movement thereof to and from said bin stations, releasable tray supporting means on the frame for engaging the trays in article holding position, and means to disengage said supporting means including presettable mechanism with positional elements associated therewith and carried by said rotatable frame, stationary positional contact members associated with said bin stations and lying in the path of rotation of said elements, the interengagement of said members and said elements serving to release said tray supporting means on arrival of a tray at a bin station as selectively predetermined by actuating said presettable mechanism.

3. In a selectively controlled sorting apparatus the combination of a horizontally disposed rotatable frame having a vertical axis and means to rotate said frame, a series of trays mounted on said frame, each movable from an article holding to an article releasing position, a series of bin stations under said frame, a series of bins pivotally linked together and describing a path corresponding to the path of rotation of said trays, means for rotation of said series of bins whereby any of said bins may be registered at any of said stations, releasable tray supporting means on the frame for engaging the trays in article holding position, and means to disengage said supporting means including presettable mechanism with positional elements associated therewith and carried by said rotatable frame, stationary positional contact members associated with said bin stations and lying in the path of rotation of said elements, the interengagement of said members and said elements serving to release said tray supporting means on arrival of a tray at a bin station as selectively predetermined by actuating said presettable mechanism.

4. In a selectively controlled sorting apparatus the combination of a frame supported for movement in an endless path, a series of trays mounted on said frame and pivotally connected thereto, means for imparting continuous movement to said frame and trays, a series of bin stations under said frame and receiving bins at said stations below said trays, each of said trays having an article holding and an article releasing position, tray supporting means on the frame adjacent each of said trays and engageable therewith to support a tray in article holding position, said supporting means being movable to release its engagement with a tray with the latter in disengaged condition pivoting to hang in article releasing position on said pivotal connections to the frame, means to disengage the tray supporting means including presettable mechanism with positional elements associated therewith and carried by said frame, stationary contact means associated with said bin stations and lying in the path of travel of said elements, the interengagement of said stationary means and said elements serving to release said tray supporting means on arrival of a tray at a bin station as selectively predetermined by actuating said presettable mechanism, and means adjacent the movable tray frame and in the path of travel of said trays in unsupported article releasing condition engageable therewith to return the trays to article holding position for support by said tray supporting means.

5. In a selectively controlled sorting apparatus a horizontally disposed rotatable frame having a vertical axis, a series of trays mounted on the frame and pivotally connected thereto, means for imparting continuous movement to said frame and trays, a series of bin stations under said frame and receiving bins at said stations below said trays, each of said trays having an article holding and an article releasing position, tray supporting means on the frame adjacent each of said trays and engageable therewith to support a tray in article holding position, said supporting means being movable to release its engagement with a tray with the latter in disengaged condition pivoting to hang in article releasing position on said pivotal connections to the frame, means to disengage the tray supporting means including presettable mechanism with positional elements associated therewith and carried by said frame, stationary contact means associated with said bin stations and lying in the path of travel of said elements, the interengagement of said stationary means and said elements serving to release said tray supporting means on arrival of a tray at a bin station as selectively predetermined by actuating said presettable mechanism, and cam means in the path of travel of trays hanging in unsupported article releasing condition and engageable therewith to return said trays to article holding position for support by said tray supporting means.

JAMES G. MACKECHNIE, Jr.

REFERENCES CITED

The following references are of record in the file of this patent:

UNITED STATES PATENTS

| Number | Name | Date |
| --- | --- | --- |
| 1,457,124 | Rinsche | May 29, 1923 |
| 1,868,243 | Miller | July 19, 1932 |
| 2,518,037 | Mackechnie | Aug. 8, 1950 |